No. 759,806. PATENTED MAY 10, 1904.
W. W. BROGA.
SNAP HOOK.
APPLICATION FILED DEC. 30, 1903.
NO MODEL.

Witnesses:
K. J. Clemons
J. E. Dealty

Inventor.
William W Broga
by Chapin Co
Attorneys.

No. 759,806. Patented May 10, 1904.

UNITED STATES PATENT OFFICE.

WILLIAM W. BROGA, OF SPRINGFIELD, MASSACHUSETTS.

SNAP-HOOK.

SPECIFICATION forming part of Letters Patent No. 759,806, dated May 10, 1904.

Application filed December 30, 1903. Serial No. 187,090. (No model.)

*To all whom it may concern:*

Be it known that I, WILLIAM W. BROGA, a citizen of the United States of America, residing at Springfield, in the county of Hampden and State of Massachusetts, have invented new and useful Improvements in Snap-Hooks, of which the following is a specification.

This invention relates to snap-hooks, the object thereof being to provide an improved construction in devices of this kind in which the locking-bolt is located axially of the shank.

By means of the improved construction which forms the subject-matter of this application the spring which shoots the bolt against the end of the hook is so arranged relative to the bolt that it not only moves the latter longitudinally, but will also rotate it more or less on its axis to lock said bolt in operative position relative to the bill of the hook.

Figure 2:
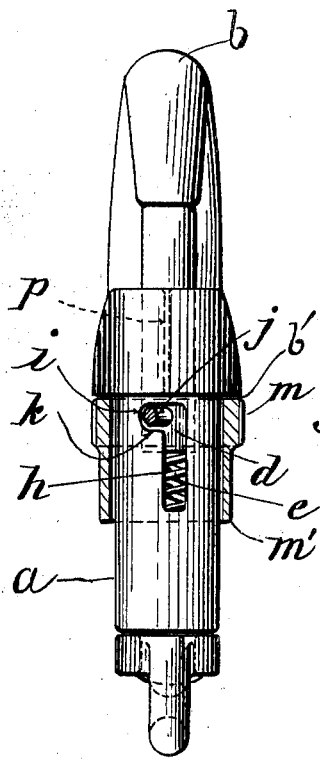
Figure 1:
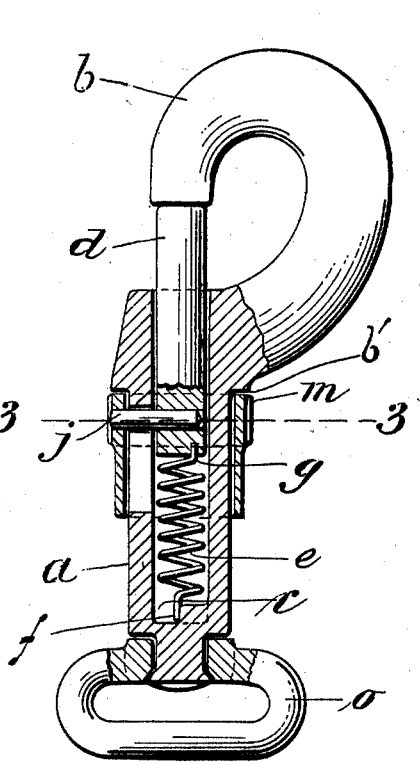
Figure 3:
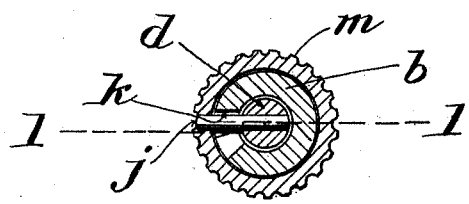

In the drawings forming part of this application, Figure 1 is a side elevation of a hook embodying this invention, a portion thereof being shown in section. Fig. 2 is a front elevation of the same, one part being shown in section. Fig. 3 is a transverse section on line 3 3, Fig. 1.

Referring to the drawings, it will be seen that the shank *a* and bill *b* of the hook may be made integral, and, as usual, this part of the construction may be made of malleable iron, with a hole *c* cored out axially of the shank *a*, which hole is adapted to receive the bolt *d* and the spring *e*, located between the inner end of the bolt and the bottom of the hole *c*. This spring is made in such manner that one end thereof, as at *f*, may engage with the shank at the bottom of the hole *c* and the opposite end, as at *g*, may engage with the lower end of the bolt *d*, whereby the bolt may not only be moved in the direction of the bill of the hook by said spring, but may also be rotated more or less on its axis by the torsional action of said spring for the purpose of locking the bolt in its most extended position against any endwise movement, the locking thereof being effected as follows: There is located, preferably in the front side of the shank, a vertical slot *h*, opening into the hole *c* therein, the upper end of said slot being extended to one side thereof, as at *i*, said lateral extension being deep enough to receive the pin *j* and to form a shoulder *k* beneath the pin *j*, whereby downward movement of the bolt will be prevented until the bolt has been rotated to take the pin out of said lateral extension *i*. The pin *j* extends through the wall of the shank and into a ring *m*, to which it may be secured by upsetting the end thereof or in any other well-known manner. This ring preferably is formed with a cylindrical extension *m'*, extending far enough down the shank when the parts are in the position shown in the drawings to cover the slot *h*, though if the shank be a very short one this may be omitted, if desired. When the ring is in the position shown in Figs. 1 and 2, its upper edge will lie under the shoulder *b'*, formed by the enlargement of the shank above that point. By this means, however, the hook may be pulled about by the head of the animal on whose halter the hook is secured and there will be no projection of any part of the ring beyond this shoulder which can catch on any object, and thus conceivably effect the withdrawal of the bolt from contact with the bill of the hook. Obviously the ring *m* might be omitted and the pin be grasped by the fingers to swing the bolt on its axis into line with the slot *h* and then to force it downward out of engagement with the bill; but the construction shown is the preferred one. Should the ring be omitted, the pin *i* would not extend beyond the shoulder *b'*.

The method of assembling the parts shown herein is to cast the bill of the hook far enough to one side to insert the spring *e* in the shank, engaging the end of the spring with the shank, as at *f*, then dropping the bolt *d* into the hole in the shank and engaging it with the upper end of the spring, as at *g*, said spring being of such length normally that after such engagement it may be compressed more or less when the bolt is inserted in the shank far enough to receive the pin *j*. This pin is passed through the ring *m*, which is first either slid over the end of the shank if the loop *o* be swiveled thereon, or if the loop *o* be integral with the shank then the ring would be split and sprung around it. Before the pin is passed through the ring and into the bolt the latter may be rotated to put a certain amount of torsional strain on the spring $e$, to the end that whenever the bolt is left free the spring will shoot the bolt upwardly toward the bill and then rotate it to locate the pin $j$ in the lateral extension $i$ of the slot $h$. The parts being assembled, the bill of the hook may be bent back into line with the end of the bolt $b$. Instead of assembling the parts in this manner the shank at the upper end thereof may be opened on the dotted line $p$, the two sides thereof being bent outwardly far enough to receive the bolt, which after being inserted in this manner would be inclosed within the shank by bending in the sides to inclose the bolt.

Having thus described my invention, what I claim, and desire to secure by Letters Patent of the United States, is—

1. A snap-hook comprising a straight, hollow shank, and a hook at one end thereof, a bolt located in the hollow shank, a spring in the shank to force the bolt toward the hook and to rotate the bolt on its axis to lock it against endwise movement, together with an annular member encircling the shank, and a connection between said member and the bolt extending through a vertical opening through the wall of the shank, which opening has a lateral extension at the upper end thereof.

2. A snap-hook comprising a cylindrical shank having a bolt-receiving hole therein, a bolt in the shank, an annular member on the shank and movable thereon, and a pin to connect the bolt with the annular member through an L-shaped slot in the wall of the shank, the bill end of the shank having a greater diameter than the other portion thereof, whereby a shoulder is formed to extend over the upper edge of said annular member.

3. A snap-hook comprising a cylindrical shank having a bolt-receiving hole therein, a bolt in the shank, an annular member on the shank rotatable and slidable thereon, and a pin to connect said member with said bolt through an L-shaped slot in the wall of the shank, a spring to impart endwise and rotatable movements to the bolt, there being a shoulder extending around the bill end of the shank, to extend over the contiguous edge of said annular member.

WILLIAM W. BROGA.

Witnesses:
K. I. CLEMONS,
WM. H. CHAPIN.